United States Patent
Trostle et al.

(10) Patent No.: US 7,296,155 B1
(45) Date of Patent: Nov. 13, 2007

(54) PROCESS AND SYSTEM PROVIDING INTERNET PROTOCOL SECURITY WITHOUT SECURE DOMAIN RESOLUTION

(75) Inventors: Jonathan Trostle, Cupertino, CA (US); William Gossman, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 838 days.

(21) Appl. No.: 10/023,622

(22) Filed: Dec. 17, 2001

Related U.S. Application Data

(60) Provisional application No. 60/296,858, filed on Jun. 8, 2001.

(51) Int. Cl.
*H04L 9/00* (2006.01)
(52) U.S. Cl. .................................................. 713/170
(58) Field of Classification Search ................. 709/226, 709/249, 250; 713/201, 160, 156, 170; 726/3, 726/4, 5, 6
See application file for complete search history.

(56) References Cited

U.S. PATENT DOCUMENTS

| | | | |
|---|---|---|---|
| 6,170,012 B1 * | 1/2001 | Coss et al. .................. 709/229 |
| 6,253,321 B1 * | 6/2001 | Nikander et al. ........... 713/160 |
| 6,353,886 B1 * | 3/2002 | Howard et al. ............. 713/156 |
| 6,697,857 B1 * | 2/2004 | Dixon et al. ................ 709/224 |
| 6,772,348 B1 * | 8/2004 | Ye .............................. 713/201 |
| 2001/0052016 A1 * | 12/2001 | Skene et al. ................ 709/226 |
| 2004/0093434 A1 * | 5/2004 | Hovell et al. ............... 709/249 |

OTHER PUBLICATIONS

Anonymous, "IPSec", 1998, Cisco Systems, Inc., pp. 1-10.
Anonymous, "IPSec Network Security", 1998, pp. 1-27.

\* cited by examiner

*Primary Examiner*—Kambiz Zand
*Assistant Examiner*—Aubrey H Wyszynski
(74) *Attorney, Agent, or Firm*—Hickman Palermo Truong & Becker LLP

(57) ABSTRACT

A system and method providing Internet protocol security without secure domain name resolution are disclosed. A processor that periodically needs to resolve domain names into network addresses has a local DNS server that includes a secure IPSEC cache, a resolver function, a security policy database, and an IPSEC layer. The cache is readable only by the IPSEC layer. Resolved domain names are cached with process and transaction identifiers that uniquely associate the resolved names with an application process and time. When resolution is needed, the cache is used to ensure that IP addresses are resolved from names that came from the application. As a result, IPSEC connections may be established without use of DNSSEC to provide secure domain name resolution.

23 Claims, 7 Drawing Sheets

PROCESS AND SYSTEM PROVIDING INTERNET PROTOCOL SECURITY WITHOUT SECURE DOMAIN RESOLUTION

CROSS-REFERENCE TO RELATED APPLICATIONS

Domestic priority is claimed under 35 U.S.C. 119(e) from prior Provisional application Ser. No. 60/296,858, filed Jun. 8, 2001, the entire contents of which are hereby incorporated by reference as if fully set forth herein.

FIELD OF INVENTION

The present invention generally relates to security in telecommunications using networks. The invention relates more specifically to an approach for providing security in the Internet Protocol security protocol (IPSEC) without secure domain name resolution.

BACKGROUND OF THE INVENTION

The secure Internet Protocol (IPSEC) provides network layer security services for computer devices that communicate using Internet Protocol over public networks. IPSEC is defined in S. Kent et al., IETF Request for Comments (RFC) 2401, RFC 2402, and RFC 2406.

IPSEC services include authentication of data origin, data confidentiality, data integrity, and protection against replay. Such services are provided below the application layer of a networked client. Accordingly, an application executing in the client generally is unaware of, or minimally aware of, the presence of IPSEC protection.

IPSEC can be used either in transport mode or in tunnel mode. Transport mode is most typically applied to protect a network link between two hosts, and is obtained by adding an encapsulating payload (ESP) to data packets, or by adding an authenticating header (AH) after the IP header of data packets to provide end-to-end protection.

Tunnel mode is normally used to secure communications of a remote access client to a server. In tunnel mode, the ESP or AH header is added to the original packet, which is then encapsulated with a new IP header. IPSEC tunnel mode allows IPSEC to be provided by intermediate hosts or security gateways when end-to-end protection is not possible. For example, an IPSEC virtual private network (VPN) can link remote sites of an organization, and the cryptographic data confidentiality service of ESP is used to provide privacy on the Internet links between the sites. Use of IPSEC to support VPNs is a significant application because great cost savings may be realized in replacing fixed private links with VPN-protected public network links.

Another practical application of IPSEC involves communication with mobile users, such as those who use laptop computers, personal digital assistants, smart cellular phones, as well as those who telecommute using desktop computers or workstations. A mobile user may connect to a server of an affiliated organization over the Internet. An IPSEC tunnel, which comprises a pair of IPSEC Security Associations (SA's), is created between the remote access client and a security gateway or firewall at the server or organization.

IPSEC is usually implemented as executable computer program instructions that form a part of the network layer on either a host or a router. For example, in a personal computer that runs the Microsoft Windows operating system, IPSEC may be implemented as a layer of the TCP/IP stack. When the IPSEC layer receives an outbound packet, either from a higher layer or from a forwarding algorithm, the IPSEC layer is required to determine whether to send the packet without IPSEC protection (i.e., pass the packet through), send the packet with IPSEC protection (apply IPSEC), or drop the packet. Such determination is made based on one or more IPSEC policies that are stored in association with the IPSEC layer, or in a data store that is accessible to the IPSEC layer.

Unfortunately, conventional implementations of IPSEC as described herein are vulnerable to attack by intruders.

For example, one problem, which arises in transport mode and tunnel mode, relates to use of domain name service (DNS) servers for resolution of domain names into IP addresses. DNSSEC is a definition of a secure form of DNS service. When DNNSEC is not used in a network, an intruder could modify a response from the DNS server. As a result, the wrong IPSEC policy could be applied, compromising security of the environment. For example, an intruder could modify a packet to specify an incorrect IP address, which would result in passing the packet without encryption. DNSSEC is not widely deployed at present, and numerous policy problems are associated with its deployment within an enterprise or across the Internet (use of dynamic IP addresses is one such problem); as a result, further deployment of DNSSEC is likely to proceed slowly, and many enterprises will continue to choose not to deploy it. Accordingly, there is a need for a way to provide security when IPSEC is used in an environment that lacks DNSSEC.

FIG. 1 is a block diagram that illustrates a network environment in which a DNS attack may occur. FIG. 1 is provided to illustrate a general scenario of attack rather than a scenario involving any particular product or implementation.

In the example environment of FIG. 1, IPSEC is used to protect a network link 106, and operates either using transport mode among hosts, or tunnel mode, between a remote access client host 102 and a target host 104. In this context, client host 102 needs to obtain certain information from target host 104. Client host 102 is communicatively coupled by link 110 to DNS server 112. The network environment also includes a malicious host 108, which is able to respond to a DNS query from the client host 102 directly or through a confederate. In this example, assume that DNS server 112 and client host 102 do not implement DNSSEC, so that no cryptographic protection is applied to DNS queries and responses for resource records managed by DNS server 112 and sent on link 110.

Client host 102 maintains a security policy database 114 that stores IPSEC policy information. In the IPSEC policy on the client host 102, malicious host 108 is part of the set of hosts for which IPSEC is not used. Thus, when the client host sends data to malicious host 108, IPSEC is not applied, and an IPSEC key management daemon is not invoked. Further assume that client host 102 executes an application 116.

In this context, an attack may proceed as follows. The client host application 116 has data to send to the target host 104. Application 116 has the DNS name of the target host 104, which may have been entered by a user. For example, application 116 could be an e-mail transport application, and the user may have composed and sent an e-mail message to a recipient whose mail account is hosted at target host 104; thus, the message header of the e-mail message would include the DNS name of the target host, and application 116 would need to resolve the DNS name into an IP address in order to dispatch the message.

The client host application 116 makes a DNS query on link 110 to DNS server 112 to obtain a list of one or more IP address(es) associated with the target host 104. Malicious host 108 or an attacker replies to the DNS query of the client host 102 with the IP address of the malicious host. The IP layer 117 of client host 102 inspects the security policy database 114 and finds that data to malicious host 108 should be passed without IPSEC protection, because the IP address of the malicious host is not included in any list of IP addresses to which IPSEC applies. Accordingly, data from client host application 116 is passed without protection to the malicious host 108. Thereafter, malicious host 108 can either impersonate the target host 104 or engage in a man-in-the-middle attack.

This vulnerability can be compounded in many environments. For example, assume that an enterprise having the environment of FIG. 1 requires user authentication as part of the application-level protocol. If the user authenticates to the application server by sending a cleartext password, then the attacker can obtain the password.

Several approaches to address this vulnerability are possible. In past one approach, the DNS protocol requests and responses that are sent over link 110 are protected using IPSEC. This approach is problematic, however, because the DNS server 112 may not have IPSEC capability. Also, local IPSEC offers no protection for DNS responses received from a remote DNS server. The latter problem is worsened if DNS server 112 accepts additional data without proper checks.

Still another problem arises from the fact that DNS server 112 normally acts as only one in a plurality of DNS servers arranged in a hierarchy rooted at a root-level DNS server. For clarity, such servers are not shown in FIG. 1, but their location in the Internet is published as part of the DNS protocol. Since the root-level DNS server and first-level DNS server are outside the control of the enterprise that owns or operates client host 102, use of IPSEC protection breaks down when client host 102 sends a query to such a higher level DNS server, because by convention, the higher level servers will not agree to use IPSEC upon receipt of a request to do so from client host 102. Signed resource records have to be used to properly protect the DNS servers.

Therefore, use of IPSEC to protect link 110 is not a workable approach and is not a complete solution.

Another approach is to use DNSSEC to secure communications with DNS server 112 over link 110. When DNSSEC is applied to a DNS zone, the DNS zone has a public key pair. The private half of the key pair is used to sign resource records for the zone. Further, subzones as well as other DNS zones can have their public keys signed by a DNS zone key. The public keys are stored in KEY resource records, and the signatures are stored in SIG resource records, which are defined in the DNS specification as set forth in D. Eastlake, "Domain Name System Security Extensions," IETF RFC 2535, March 1999. In addition, users can store keys in the DNS, using the KEY resource records. Thus, DNSSEC can provide some of the functionality of a public key infrastructure.

An Internet-wide deployment of DNSSEC would consist of the root signing the high-level DNS zones (.com, org, etc.). These zones would then sign the zones beneath them and so on. A local DNSSEC deployment occurs when an organization uses its own DNSSEC zone key as the root DNSSEC key. Two separate organizations could secure DNS traffic that is exchanged between themselves by cross-certifying each other's DNS zone keys.

However, DNSSEC is not widely deployed at present, and unlikely to be deployed in the near term across the Internet. For organizations that use multiple first-level DNS names (e.g., an enterprise that operates servers at DNS names example.org, example-product.com, and example-service.com), DNSSEC deployment is difficult to manage because no single high-level root key can be used for all domains. The same issue applies to use of DNSSEC in an extranet VPN environment where VPN sites are located in multiple organizations. Further, for many organizations, deployment of DNSSEC would require a complete upgrade of the organizations' DNS infrastructure, which is disruptive, time-consuming, and expensive. Deploying DNSSEC also adds another security dependency, both with respect to software code maintenance and security administration, which can weaken all security of an organization and which imposes additional administrative overhead and expense in managing another security infrastructure.

Technical references that provide additional background regarding this context include: J. Trostle et al., "Implementation of Crossrealm Referral Handling in the MIT Kerberos Client," Proceedings of the 2001 Network and Distributed Systems Symposium, February 2001, pp. 201-210; D. Eastlake, "Domain Name Security System Security Extensions," IETF Request for Comments (RFC) 2535, March 1999; J. Linn, "Generic Security Service Application Program Interface Version 2, Update 1," RFC 2743, January 2000; and T. Dierks et al., "The TLS Protocol Version 1.0," RFC 2743, January 1999; P. Mockapetris, "Domain Names—Concepts and Facilities," RFC 1034, November 1987; P. Mockapetris, "Domain Names—Implementation and Specification," RFC 1035, November 1987; S. Kent et al., "Security Architecture for the Internet Protocol," RFC 2401, November 1998; S. Kent et al., "IP Encapsulating Security Payload (ESP)," RFC 2406, November 1998; S. Kent et al., "IP Authentication Header," RFC 2402, November 1998, D. McDonald, "PF KEY Key Management APL Version 2," RFC 2367, July 1998.

Based on the foregoing, there is a clear need in this technical field for a way to eliminate the need for DNSSEC to provide secure domain name resolution in an environment that uses IPSEC transport mode or remote access tunnel mode to encrypt communications.

In particular, there is a need for a way to provide security for such communications in a way that has minimal impact on the existing information technology infrastructure of an enterprise, and maximum protection against attacks of the type outlined above.

SUMMARY OF THE INVENTION

The foregoing needs, and other needs and objects that will become apparent for the following description, are achieved in the present invention, which comprises, in one aspect, a system and method providing Internet protocol security without secure domain name resolution. A processor that periodically needs to resolve domain names into network addresses has a local DNS server that includes a secure IPSEC cache, a resolver function, a security policy database, and an IPSEC layer. The cache is readable only by the IPSEC layer. Resolved domain names are cached with process and transaction identifiers that uniquely associate the resolved names with an application process and time. When resolution is needed, the cache is used to ensure that IP addresses are resolved from names that came from the application. As a result, IPSEC connections may be established without use of DNSSEC to provide secure domain name resolution.

In another aspect, the invention includes a computer system providing Internet protocol security without secure domain name resolution, comprising a local domain name service (DNS) server, a security policy data store, and programmed instructions. The local domain name service (DNS) server is communicatively coupled to a processor, and includes a secure Internet security protocol (IPSEC) cache. The secure IPSEC cache is readable only by an Internet protocol (IP) processing layer of an operating system that controls execution of an application program by the processor. The security policy data store is communicatively coupled to the IP processing layer. The programmed instructions are in a computer-readable medium accessible to the processor. When executed by the processor, the instructions result in the processor receiving a message generated as a result of execution of the application program and that contains a domain name. The secure IPSEC cache is searched for an entry that matches the domain name. The security policy data store is queried for an IPSEC policy matching the domain name. The IPSEC policy is applied to the message, and the matching entry is purged from the cache.

In another aspect, a method for providing Internet protocol security without secure domain name resolution is provided. A message is received that is generated as a result of execution of an application program and that contains a domain name. The secure Internet security protocol (IPSEC) cache is searched for an entry that matches the domain name. The security policy data store is queried for an IPSEC policy matching the domain name. The IPSEC policy is applied to the message, and the matching entry is purged from the cache.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF A PREFERRED EMBODIMENT

The foregoing needs, and other needs and objects that will become apparent for the following description, are achieved in the present invention, which comprises, in one aspect, a method and system for eliminating the need for secure domain name resolution for the secure Internet Protocol. In other aspects, the invention encompasses a computer apparatus, a computer readable medium, and a carrier wave configured to carry out the foregoing steps.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1. STRUCTURAL OVERVIEW
    2. FUNCTIONAL OVERVIEW
    2.1 GENERALLY
    2.2 USE OF SECURE DNS IPSEC CACHE APPROACH WITH REMOTE ACCESS
    2.3 USE OF UNIQUE SECURITY ASSOCIATIONS
    3. IMPLEMENTATION APPROACHES
    3.1 APPROACH USING NO MODIFICATIONS TO CODE OR FUNCTION PARAMETERS
    3.2 APPROACH USING ENHANCED API
    3.3 APPROACH USING MODIFICATION OF "HOSTENT" STRUCTURE DATA
    3.4 APPROACH USING RETURN OF PSEUDORANDOM VALUE
    3.5 SUMMARY OF APPROACHES
    4. APPLYING DNS IPSEC CACHE TO REMOTE ACCESS
    5. ADDITIONAL CONSIDERATIONS FOR IPSEC TRANSPORT MODE
    6. HARDWARE OVERVIEW
    7. EXTENSIONS AND ALTERNATIVES 1.0 Structural Overview In general, according to one approach, IPSEC policy is based on DNS names, and is combined with a local DNS resolver cache. This approach is applicable to IPSEC transport mode, and to remote access using tunnel mode. In this context, in remote access using tunnel mode, the tunnel initiation host is the same as the host that sends the data. This environment may occur when a mobile user accesses an enterprise network using an IPSEC tunnel that is initiated from the user's host. For a site-to-site IPSEC tunnel scenario, it may be appropriate to assume that the DNS queries and responses are not tampered with, since the network links in the organization on both sides of the IPSEC tunnel are considered secure.

Figure 2A:
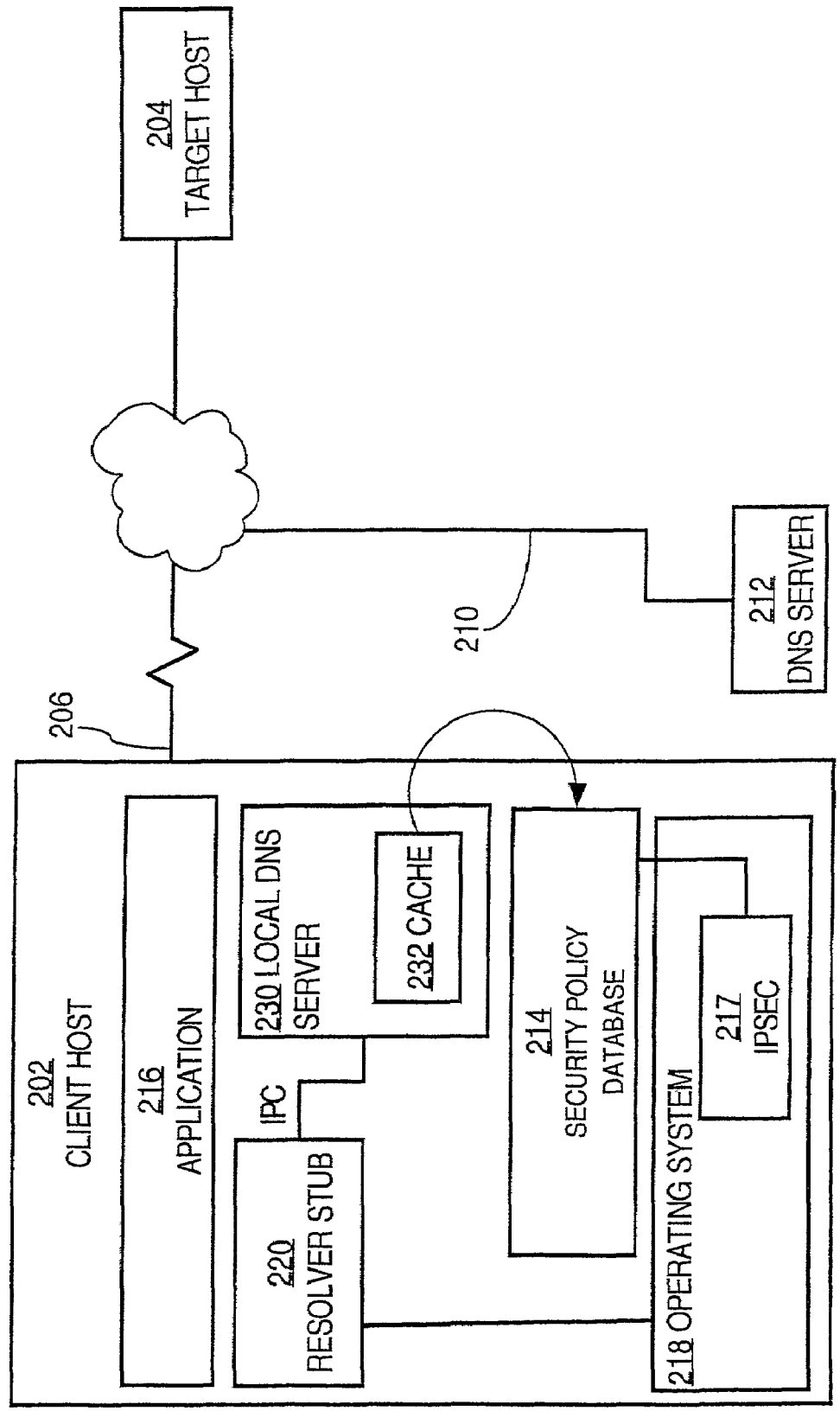
FIG. 2A is a block diagram that illustrates an overview of one embodiment of a system that eliminates the need for secure domain name resolution.

FIG. 2A is a block diagram that illustrates an overview of one embodiment of a system that eliminates the need for secure domain name resolution. The system of FIG. 2A generally includes a client host 202, a network, a target host 204, and a DNS server 212.

Client host 202 is any workstation, personal computer, or other computing device. Client host 202 executes an application 216 that has access to a resolver stub function 220, a DNS server 230, a security policy database 214, and an operating system 218. Application 216 may carry out any desired processing function. Resolver stub 220 forms a part of a library of basic application functions to which application 216 links at runtime or compile time. Application 216 calls resolver stub 220 when the application needs to resolve a DNS name into an IP address, or into an equivalent value that is directly usable in network routing or message telecommunications.

Local DNS server 230 executes in client host 202 and functions to locally resolve DNS names into IP addresses. DNS server 230 also includes a secure cache 232. Operating system 218 includes an IPSEC layer 217, e.g., as part of the TCP/IP stack. IPSEC layer 217 and cache 232 are communicatively coupled to a security policy database 214 that is maintained by IPSEC layer 217.

The secure cache 232 and IPSEC layer 217 are configured so that the secure cache may be updated (written to) by either the DNS server or the IPSEC layer, but checked for entries (read from) only by the IPSEC layer. Thus, the secure IPSEC cache disclosed herein is differs distinctly from conventional DNS caching approaches. In one embodiment, the secure cache 232 is provided with a means to detect what part of operating system 218 is querying the cache, and to reject any query other than a query from IPSEC layer 217.

Security policy database 214 stores information that defines, among other things, when IPSEC is applied to particular traffic. For example, policy information in security policy database 214 may indicate that traffic destined for a particular host is required to use IPSEC for security. In one approach, the IPSEC policies stored in security policy database 214 are based on DNS names rather than IP addresses. Thus a policy in database 214 may indicate, "for traffic directed to host <example.com>, apply IPSEC to all outbound packets." Use of DNS names as a basis of policies in the security policy database 214 is distinct from prior approaches that specify IP addresses in policies.

Operating system 218 includes an IPSEC layer 217 that can communicate with security policy database 214 to obtain policy information. For example, the IP layer 217 of client host 202 inspects the security policy database 214 in order to determine whether data directed to a particular host should be passed with or without IPSEC protection (but RFC 2401 allows for DNS names in IPSEC policy). In an embodiment that uses Microsoft Windows 2000 as the operating system 218, IPSEC layer 217 forms a part of the TCP/IP stack.

Figure 2B:
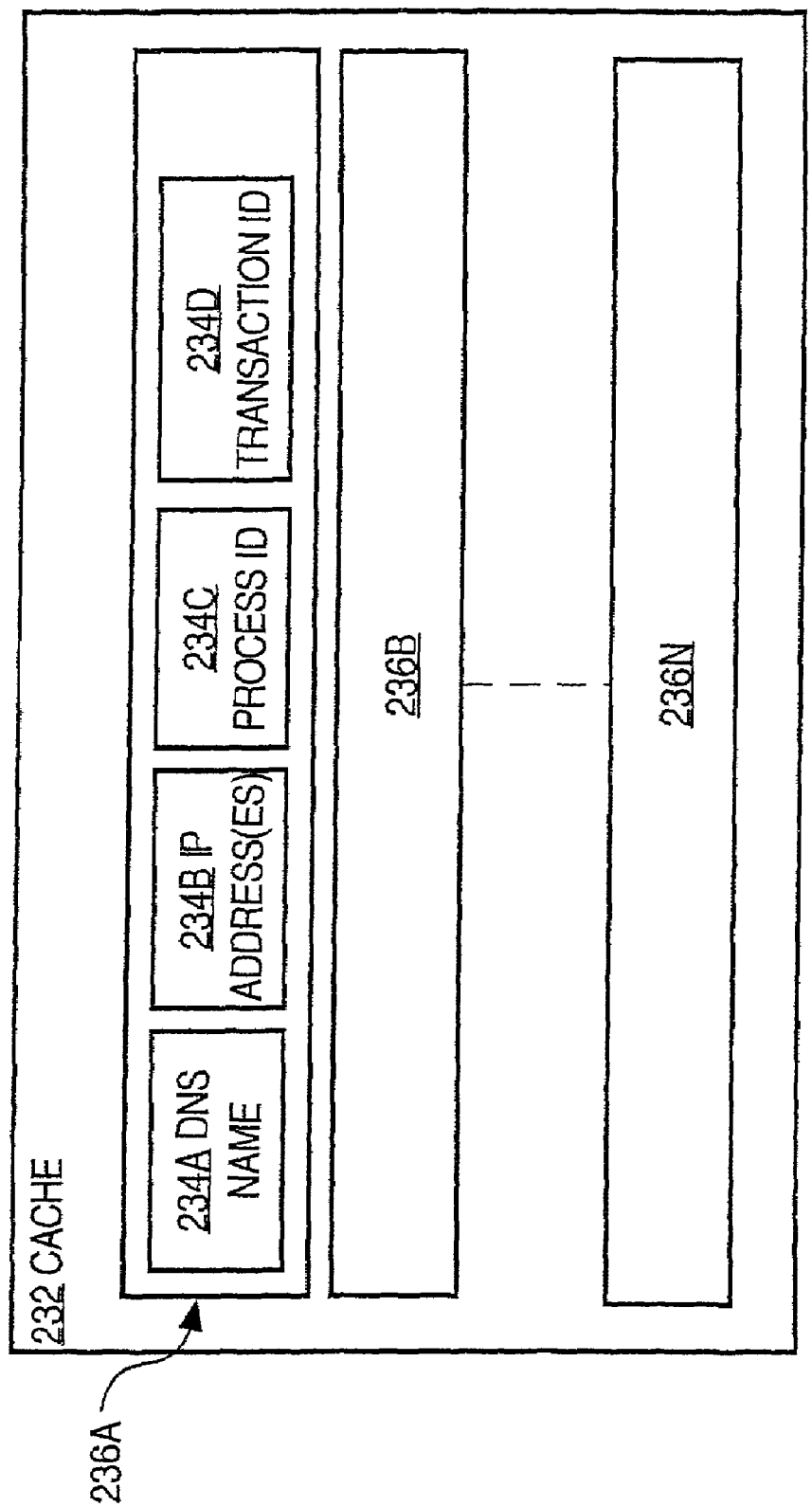
FIG. 2B is a block diagram of an example structure that may be used for a secure IPSEC cache.

FIG. 2B is a block diagram of an example structure that may be used for a secure IPSEC cache in a system that uses either a UNIX variant or Microsoft Windows 2000/XP as the operating system. In general, cache 232 comprises an unlimited plurality of entries 236A, 236B, 236N, etc. Each entry comprises a DNS name value 234A, one or more IP address values 234B, and a process identifier 234C. Each DNS name value 234A is a string value that consists of a valid DNS name. IP addresses values 234B comprise one or more valid IP address values that identify one or more servers that are validly associated with the DNS name. The process identifier 234C uniquely identifies a particular executing process instance of application 216. In this way, a cache entry is uniquely associated with a particular time that application 216 executes by virtue of association with a particular application instance.

A cache collision may occur if the cache is permitted to store two nearly duplicate entries, e.g., entries having the form (dns-name-1, ip-address-1, process-id-1) and (dns-name-2, ip-address-1, process-id-1). To enable the IPSEC layer to disambiguate such entries, in one approach, the cache also stores a pseudo-random transaction identifier 234D in each cache entry. For example, a resolver function that is accessed via resolver stub 220 and a socket API associated with IPSEC layer 217 may include the transaction identifier as an argument. Alternatively, the resolver function call may return a structured data object that includes either one or more resolved IP address(es), and the transaction identifier. In a UNIX-based operating system, for example, the resolver function call returns values in the hostent structure, and the transaction identifier may be packaged as a value in the hostent structure.

In the approach of FIG. 2A, DNS server 230 is co-located with application 216 and executes as a separate, trusted user space process. The DNS server process maintains the secure DNS IPSEC cache, and code that implements internal functions of the resolver is associated with the DNS server process. The resolver code in the application makes IPC calls to the DNS server process; for each call, the DNS server process is responsible for determining the process identifier of the IPC client, and for adding the new entry in to the secure DNS IPSEC cache.

In an alternative design approach, the resolver call is layered over an operating system call. In this approach, the process identifier is determined by the kernel code that runs on behalf of the application that invoked the system call. The DNS IPSEC cache, and code that implements internal functions of the resolver, resides in the operating system kernel.

Different design approaches may be used in an environment in which the entire system is trusted, and no un-trusted application level code can run. However, the resolver is still modified to record the DNS name, IP address(es), process identifier, and transaction identifier in the secure DNS IPSEC cache.

2.0 Functional Overview 2.1 Generally

In general, in operation, application 216 executes and arrives at a point where the application needs to resolve a domain name into an IP address. The application 216 requests IPSEC layer to carry out the resolution, for example, by invoking an operating system function that performs resolution. For IPSEC layer 217 of host operating system 218 to service such a request to resolve a DNS name into an IP address, the IPSEC layer 217 first searches cache 232 for a matching DNS name. Otherwise, the destination IP address is used as the policy parameter.

Figure 3A:
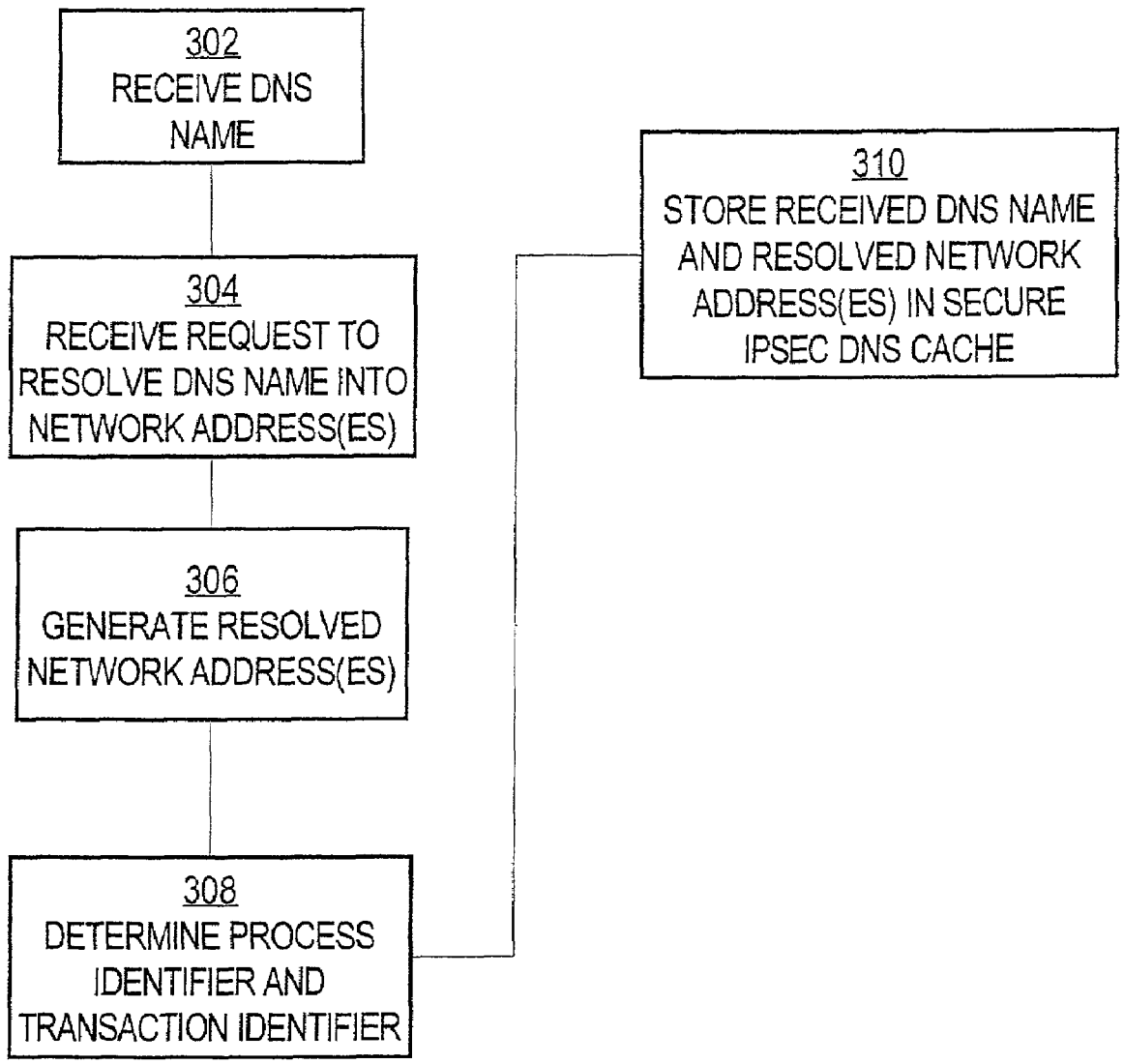
FIG. 3A is a flow diagram illustrating a process of establishing a secure DNS cache entry for use in IPSEC packet processing.

FIG. 3A is a flow diagram illustrating a process of establishing a secure DNS cache entry for use in IPSEC packet processing.

In block 302, a DNS name is received. For example, application 216 receives or generates a DNS name. For example, application 216 may receive a DNS name as user input, or may receive the DNS name as value returned from an API call to another application, or may self-generate the DNS name programmatically. Block 302 may also represent providing a DNS name to resolver 220 as part of a DNS resolution call.

In block 304, a request to resolve a DNS name into one or more network addresses is received. For example, application 216 uses local DNS server 230 to map the DNS name into one or more IP address(es). Application 216 may involve DNS server 230 using a call to resolver stub 220. For example, with a UNIX-based operating system, the gethosthostbyname library call would be used to invoke the resolver.

In block 306, one or more resolved network addresses are generated. Block 306 also may involve resolver stub 220 providing an IP address as a response to a call from application 216.

In block 310, the original DNS name and the returned IP address(es) are stored in a cache entry 232 in secure IPSEC DNS cache 230. Cache entry 232 also includes a process identifier and a transaction identifier. Accordingly, in block 308, the process identifier and transaction identifier are determined. The process identifier uniquely identifies the then-currently-executing process instance of application 216. The process identifier is obtained in a secure manner; for example, the process identifier is received in response to an operating system call or other mechanism that is restricted to trusted client host 202. The transaction identifier uniquely identifies the then-currently-occurring DNS resolution transaction, or another processing transaction generated by the process.

Figure 3B:
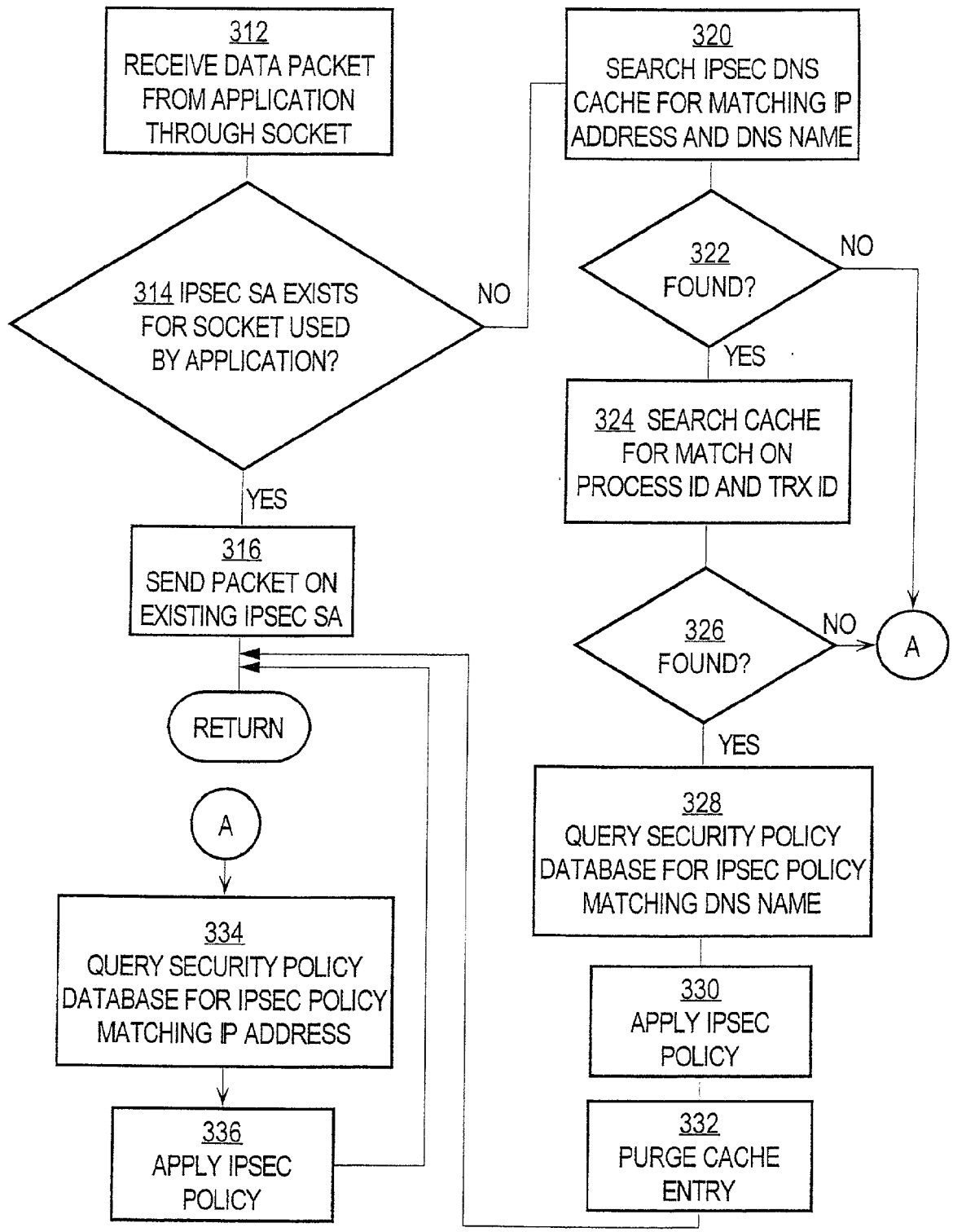
FIG. 3B is a flow diagram illustrating an example method of processing a data packet using a secure DNS IPSEC cache.

FIG. 3B is a flow diagram illustrating an example method of processing a data packet using a secure DNS IPSEC cache.

In block 312, a data packet is received from an application through a socket connection or similar means. In one embodiment, block 312 involves receiving a data packet from application 216 at IPSEC layer 217. When the IPSEC layer 217 receives the data packet from the application, the IPSEC layer determines whether it already has an IPSEC security association (SA) associated with the socket, as indicated by block 314. If so, the IPSEC layer sends the packet on that IPSEC SA, as shown by block 316.

If there is no existing SA, the IPSEC layer searches the secure IPSEC DNS cache 232 for a matching IP address and corresponding DNS name, as indicated by block 320. If a cache miss occurs, the IPSEC layer 217 queries the security policy database 214 in conventional manner, and applies any IPSEC policy identified therein to the packet, as shown by block 322, block 334, and block 336. Applying the policy may involve dropping the packet, applying AH encapsulation, applying ESP encryption and encapsulation, etc.

If a cache hit occurs based on the IP address and DNS name, the IPSEC layer further checks the cache to see if there is a match with the process identifier and transaction identifier, as shown by block 324. If so, then IPSEC layer issues a query to the security policy database to locate an IPSEC policy having a DNS name as a destination identifier, as indicated by block 326 and block 328. If a matching policy is found, the process applies the IPSEC policy to the packet, as shown by block 330. In other embodiments, process identifiers are not used to map an IP address to the correct DNS name, and alternative approaches are used as described below.

In block 332, the matching cache entry is purged. Thus, each cache entry is used only once, and purged immediately after the IPSEC layer accesses the cache entry. When an application process terminates, the operating system removes all entries in the secure IPSEC DNS cache 230 that are associated with the process identifier of the terminated process. Thereafter, the process identifier can be re-used.

Accordingly, using this approach, the IPSEC layer of a host can verify that IPSEC policy is based on the original DNS name that the application provided.

Figure 1:
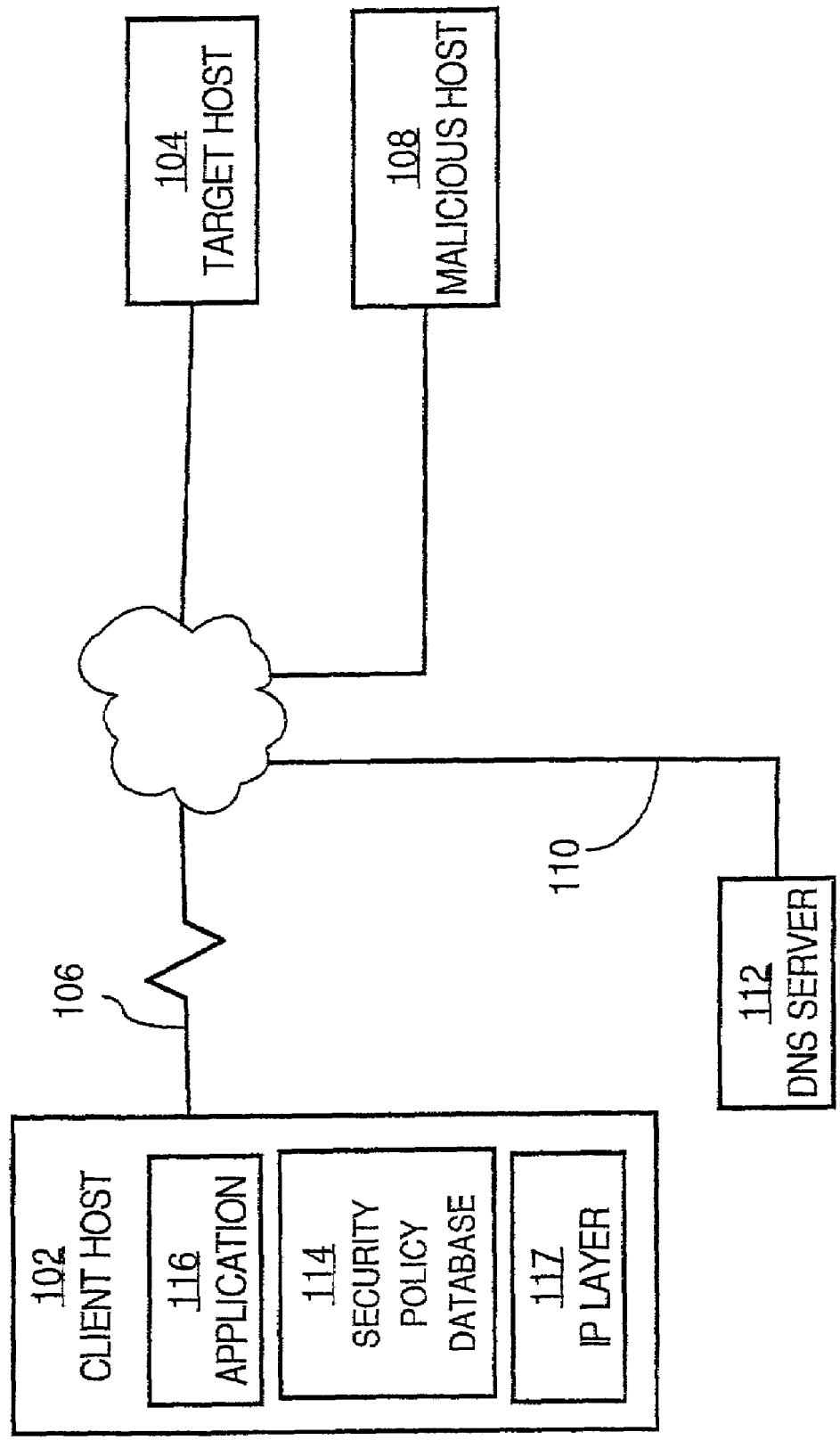
FIG. 1 is a block diagram that illustrates a network environment in which a DNS attack may occur.

To illustrate security benefits offered by the approaches described herein, assume that the attack described in the Background section above in connection with FIG. 1 is attempted against a system that is configured as shown in FIG. 2A.

1. The application uses the DNS resolver to map the inputted DNS name into an IP address. In a UNIX-based system, the "gethosthostbyname" library call could be used to invoke the resolver. As a result, the original DNS name, as entered by the user and then completed to a fully qualified DNS name using the host's DNS completion list, and the returned IP address(es) are cached, along with either a transaction identifier ("tid") or a process identifier and a thread identifier. This information is recorded in the IPSEC DNS or local host cache that is accessible to the IPSEC layer. Design and implementation details of this process are described in following sections.

2. When the IPSEC layer receives the data packet from the application, it checks to see if it already has an IPSEC security association associated with the socket. If so, it sends the packet on that IPSEC SA. If not, the IPSEC layer checks the local cache for a matching IP address and corresponding DNS name, or for a matching transaction identifier. If no name is found, it proceeds to check the IPSEC policy in the standard way. If a DNS name is found (checking to see that there is a match with the process identifier and transaction identifier as part of determining whether there is a matching DNS name), then the DNS name is used as the destination identifier when checking the IPSEC policy, instead of the destination IP address. If a new IPSEC SA is created using the DNS destination name, then both the destination DNS name and IP address are associated with the newly created IPSEC SA. This IPSEC SA is only reused for other sockets if both the associated DNS name and IP address for the new socket matches with the values associated with the SA.

Thus, client host 202 will attempt to create an IPSEC SA, if IPSEC policy indicates that one should be created. However, it will try to create an IPSEC SA with the destination IP address of malicious host 108. As a result, authentication of the SA will fail. In this case, no application level data will flow to the malicious host 108. In one embodiment, an audit record is generated to identify details of the anomalous event, which can be identified as a possible malicious attack.

Further, when the application level process starts with an IP address identifier, no entry will appear in the local cache. After determining that no appropriate entry is in the local cache, the IPSEC layer will check the IPSEC policy using the destination IP address instead of a destination DNS name. Also, if a DNS name is used to check IPSEC policy, then it will be passed to the key daemon, which must use that identifier for the peer when establishing IPSEC SA's.

2.2 Use of Unique Security Associations

Some systems enable configuration of IPSEC policy such that each socket receives a unique IPSEC SA. IPSEC SA's should not be shared based on a common destination IP address alone, without taking into account the DNS name, if present in the local cache.

Figure 3C:
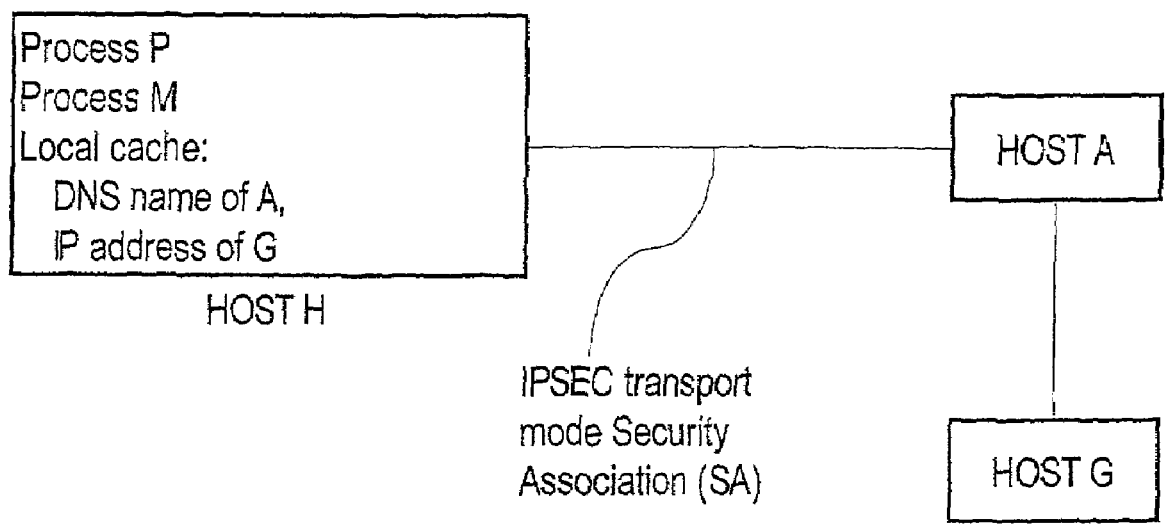
FIG. 3C is a block diagram that illustrates hosts in a network for the purpose of showing benefits of the approach herein.

FIG. 3C is a block diagram that illustrates hosts in a network for the purpose of showing benefits of the approach herein. A network includes host H, host A, and host G. Traffic from host H to host G should be sent in an IPSEC transport mode SA. However, a malicious process M is running on host H.

Process M, in cooperation with a malicious host A on the path from host H to host G, desires to open up an IPSEC SA to host A. Process M makes a DNS query to its local DNS server asking for the IP address of host A. The IP address of host G is returned.

Process M then opens up an IPSEC SA to host A, but the local cache contains the mapping from the DNS name of host A to the IP address of G. A legitimate process P on host H attempts to begin IPSEC protected communications with a process on host G. The IPSEC layer on host H determines that an IPSEC transport mode SA between host H and host G already exists, and therefore the IPSEC layer on host H does not attempt to create new IPSEC SA's. Instead, the traffic from host P is also passed in the existing SA created by process M. Host A now has access to all traffic destined for host G.

The foregoing vulnerability is not removed by deploying DNSSEC. However, using unique IPSEC SA's is an effective countermeasure. If DNSSEC is deployed, the malicious process M may make a recursive DNS query to a DNSSEC domain controlled by a collaborator, and can then carry out the scenario described above.

3.0 Implementation Approaches

Implementations of the general approach described herein should consider two key design issues. A first design issue is, given a resolver call by an application that associates a returned IP address with a DNS hostname, how to make that association known to the IP layer. The IP layer becomes aware of the destination IP address during the socket API calls.

In particular, the proper DNS name to use may be ambiguous. For example, suppose the DNS IPSEC cache includes two entries:

(dns name1, ip addr1, process id1, tid1)

and (dns name2, ip addr1, process id1, tid1)

The mappings in the cache cannot be trusted, because a bad mapping can be placed in the cache by an attacker who tampers with a DNS reply, or impersonates a DNS server. Thus it is important that the IP layer select the entry in the cache that corresponds to the existing socket API call.

The foregoing vulnerability is removed by only allowing SA sharing if there is a match among both destination DNS names and destination IP addresses of the existing SA and the new request.

3.1 Approach Using No Modifications to Code or Function Parameters

In a first approach that addresses the foregoing issues, no modifications are made to either application source code or the parameters of either the resolver or socket API calls. The DNS IPSEC cache comprises entries of the form (dns name, ip addr, process id, thread id). The "process id" value is an identifier of a process that invokes the resolver. "Thread id" is an identifier of the thread that invokes the resolver Using this scheme there are at least two ways that ambiguities can arise; an ambiguity exists when the cache holds two entries of the form: (dns name1, ip addr1, process id1, tid1) and (dns name2, ip addr1, process id1, tid1). In this approach, entries are removed from the cache immediately after being accessed by the IP layer.

The first way an ambiguity arises is that a single thread can make two resolver calls r1 and r2 and then make the corresponding socket API calls in the opposite order. Thus, disambiguating the above two entries by using a first-in, first-out algorithm is not sufficient.

Second, a malicious process can make a resolver call that results in an ambiguity if the operating system is unable to reliably determine the process identifier of the malicious process at the time of the resolver call. Thus, when this approach is used, code outside the process must be able to use operating system calls to determine the process identifier of the resolver calling process. The only exception is if the application-level processes all are trusted. For reliable process identification, a co-located DNS server, running as a separate trusted user space process, will maintain the DNS IPSEC cache, and code implementing the resolver will reside within that process. The resolver code in the application will make an IPC call to this local DNS server; the DNS server is responsible for determining the process identifier of the IPC client, and adding the new entry into the DNS IPSEC cache.

A third problem occurs in a multithreaded application where one thread makes the resolver call and the second one makes the socket API calls. In this case, it is difficult to match up the intended DNS destination name with the calling thread. The same problem occurs in a multi-process application where one process makes a resolver call and another one makes the socket API calls.

Despite the issues just described, this approach may be satisfactory for some specialized environments.

3.2 Approach Using Enhanced API

In a second approach, new application programming interfaces (API's) are used. This approach is suitable when an application is being developed with the goal of using transport mode IPSEC protection. A shim library can be used if the application must later be run on a system that does not support the new API's. In one specific implementation, three APIs encapsulate functions of the resolver: "gethostbyname_ipsec", "gethostbyname2", and "getaddrinfo_ipsec". Prototypes may have the form:

struct hostent *gethostbyname_ipsec(const char *name, uint64_t *tid);

struct hostent *gethostbyname2_ipsec(const char *name, int family, uint64_t *tid);

int getaddrinfo_ipsec(const char *hostname, const char *service, const struct addrinfo *hints, struct addrinfo **result, uint64_t *tid);

The *tid parameter is an OUT in the above API's and an IN in the following API (as the *optval parameter):

int setsockopt(int sockfd, int level, int optname, const void *optval, socklen_t optlen);

The calling sequence could be:

Uint64_t *tid;

h = gethostbyname_ipsec("foo.example.org",tid);

. . .

fd = Socket(AF_INET, SOCK_STREAM, 0);

setsockopt(fd, IPPROTO_IP, IP_DNS_IPSEC, tid, tid_length);

. . .

The "setsockopt" API is used to associate the tid with the socket. The IPSEC layer can use the tid to associate a destination DNS name with the socket in order to look up IPSEC policy.

In this way, the IP layer can associate the appropriate DNS name with the inputted destination IP address. The DNS IPSEC cache contains entries of the form (dns name, tid), where tid is the transaction identifier. The tid should be sufficiently long to rule out guessing attacks. In one embodiment, tid values are 64 bits in length. While this approach may require modifying legacy applications to call the modified API, applications programmed to depend on IPSEC transport mode security need to be modified for other reasons anyway, as described herein in the section entitled "Additional Considerations for IPSEC Transport Mode." However, this is otherwise a low risk approach.

3.3 Approach Using Modification of "Hostent" Structure Data

In yet another approach, the tid is included as part of the set of one or more IP address(es) that are returned by the resolver function call. The application is assumed to treat the returned IP address as an atomic or opaque data object. In UNIX-based systems, this assumption is facilitated by use of the "hostent" structure that is returned from the "gethostbyname" call. In the LINUX operating system, the "hostent" structure is defined as follows:

```
struct hostent {
    char    *h_name;        /* official name of host */
    char    **h_aliases;    /* alias list */
    int     h_addrtype;     /* host address type */
    int     h_length;       /* length of address */
    char    **h_addr_list;  /* list of addresses */
}
```

Thus, the address(es) that is(are) returned from the "gethostbyname" function call include additional data consisting of the transaction identifier. The advantage of this approach is transparency to the application.

As another option, the tid can be replaced with the actual DNS name that was inputted into the DNS "gethostbyname" function call. If the inputted name is a short name, the converted long name should be returned, which includes the short name as the first part of the returned value. In this case, no cache is needed, and therefore this option is not further discussed herein.

This approach has two potential problems. First, the operating system may perform an operation on the IP address during one of the socket calls that would destroy the additional tid or DNS naming information. The second problem is that the application itself may not treat the IP address as opaque data, in which case, the additional embedded information may be destroyed in between the "gethostbyname" function call and some of the later socket API calls. For example, code that assumes that IP addresses are always 4 bytes in length may destroy the tid portion of the returned value. Such an assumption in code is not a good programming practice, and in fact with IPv6 it is an invalid assumption; therefore, a more correct practice is to use the system-defined type for representing an IP address. For example, in LINUX an IPv4 address is defined as:

```
typedef uint32_t in_addr_t;
struct in_addr
{
    in_addr_t s_addr;
}
```

Based on this approach, extending the address information with additional opaque data involves modifying the definition of the "in_addr" structure and re-compiling all code that references it. If an existing program is not recompiled, it will not be able to take advantage of this third approach. Further, any program, library, or system software that has hard-coded size assumptions concerning IP addresses or the "in_addr" or "sockaddr_in" structures would not be compatible with a modification of this nature.

In one example implementation, the LINUX 2.4.2 kernel may be rebuilt with the following changes:

```
typedef struct  {
        __u32 p1;
        __u32 p2;
    } dns_ipsec_tid;
/* Internet address */
struct in_addr {
        __u32 s_addr;
        dns_ipsec_tid tid;   // new
};
```

This modification extends the length of an "in_addr" structure by eight bytes, which carry an identifier that is unique to each address. The modified kernel has been compiled, booted and executed successfully in a laboratory system.

3.4 Approach Using Return of Pseudorandom Value

In a fourth approach, neither access to application source code nor recompilation is necessary. In the fourth approach, a pseudo-random number is returned to the application by the resolver call, in place of the IP address. The resolver obtains the pseudo-random number from the co-located DNS server. This also places a four-tuple, comprising the client application process identifier, pseudo-random number, DNS name, and true destination IP address, in the cache (the process identifier is not required). When the IPSEC layer checks IPSEC policy, it uses the IP address from the application socket API call as the index into the cache; this IP address index is the pseudo-random identifier. The IPSEC layer obtains the DNS name and true IP address out of the cache. The four-tuple of values is then purged from the cache.

An IPv4 address comprises 32 bits, which is expected to be enough to prevent cache collision attacks, where the attacks result in a four-tuple in the cache with the same pseudo-random identifier and process identifier as a true IP address being used by an application. Applying the birthday paradox, collisions are expected likely if the DNS IPSEC cache has approximately 65,000 entries associated with a single process, and there are also 65,000 destination addresses being used by the same process. In practice, this type of scenario is unlikely to arise. The use of IPv6 would make collisions even less likely.

An application that starts with an IP address instead of a DNS name will end up causing a cache miss. The IP address will then be used as the policy destination parameter. A malicious process could cause a cache collision by adding an entry into the cache with the same pseudo-random identifier as the IP address that a victim process starts with. Therefore, generation of the pseudo-random number, and writing to the cache, are performed by the trusted co-located DNS server.

Since the application will not have the true destination IP address returned in the resolver call, there are most likely a few applications for which this approach cannot be used. On hosts with both types of applications, local configuration can be used to cause the resolver to return the true destination IP address to the applications that require it. This is expected to be few applications. Certain transport layer protocols, such as UDP and TCP, require access to the true destination IP address; the transport layer implementations would have to be modified to obtain the true IP address from the cache where necessary. Socket calls that manipulate or need the IP address such as "gethostbyaddr", etc., also must be re-implemented to use the cache to obtain the real IP address, if applicable.

3.5 Summary of Approaches

This section compares and contrasts the approaches herein. The first approach described above requires no changes to applications, but it does require that applications make resolver and associated socket API calls within a single thread and that the socket API calls immediately follow the associated resolver call. The second approach is workable for all applications that can be modified to call the newly defined API's, on systems that support the API's. This approach is suitable for applications that are being developed with IPSEC protection in mind on systems that support the API's.

The third approach is suitable for applications that treat IP addresses opaquely, do not make length assumptions about the IP address, and can be compiled with a new include file that redefines the "in_addr" structure. The fourth approach requires no changes to applications, but cannot be used for applications that must have the true destination IP address returned in the resolver API call, i.e., applications that fail to treat IP addresses opaquely. This approach also requires modifications to the transport layer, and to certain socket library calls such as "gethostbyaddr," "inet_pton", etc., to maintain transparency at the application layer.

All approaches require modification at the IPSEC layer so that the DNS name is obtained and used to make IPSEC policy decisions.

4. Use of Secure DNS IPSEC Cache Approach with Remote Access

Security of communications among a remote access client and an enterprise server or other host is improved using the secure DNS IPSEC cache approach described herein. Without such an approach, or use of DNSSEC, the client may receive an incorrect mapping of a target DNS name to its IP address.

Security is also improved if the remote access client encapsulates all its traffic in the IPSEC tunnel mode SA to the security gateway, without using split tunneling, since there is no unprotected traffic. However, if transport mode to internal hosts is used in conjunction with IPSEC tunnel mode, and domains of the organization span multiple high-level DNS names, then the DNS queries will hit higher-level DNS servers that are outside the control of the organization. The DNS responses to such queries will be un-authenticated.

In this context, the secure DNS IPSEC cache approach described herein can be applied to result in secure communication. The DNS IPSEC cache approach offers better scalability if the organization continues to add more high-level DNS names. Also, the use of unique SA's, as described herein in the next section, is not required, because all IPSEC SA's reference trusted security gateways.

5. Additional Considerations for IPSEC Transport Mode

For providing authentication, data integrity, and data confidentiality from end to end, IPSEC transport mode can be used. The advantage is minimal impact on applications. As shown above, unless domain name resolution is taken into account, the benefits may be illusory. In other words, depending on the application, the environment, and the format of the IPSEC policy rule set, IPSEC transport mode may not be able to provide the above security services.

Other issues exist with respect to transport mode. Some popular operating systems, including Sun's Solaris and Microsoft Windows2000 do not provide API's to allow an application to obtain the IPSEC authenticated name of the peer. In these cases, an application cannot easily use the authenticated name for access control decisions. For the Windows2000 operating system, the identity of the peer is always the host identity. Thus, user authentication must occur at the application level. One possibility may be to develop a custom key daemon. Alternatively, some operating systems support the PF KEY interface, which can be used to build a key daemon. An application-level API would also be provided to pull IPSEC authenticated identities out of the key daemon.

For the foregoing reasons, application-level security approaches must be considered for end-to-end security.

6. Hardware Overview

Figure 4:
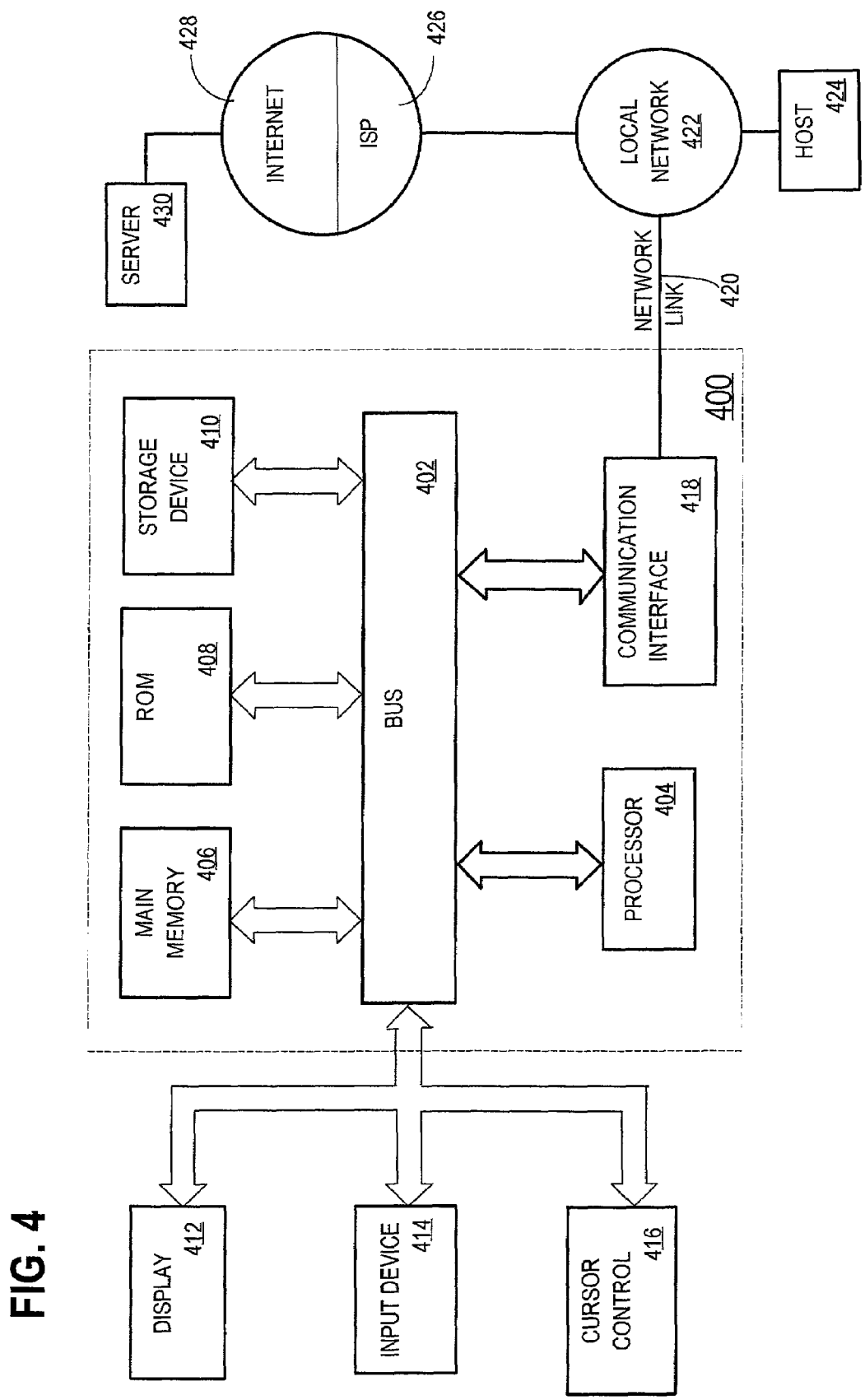
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing security in the Internet Protocol security protocol (IPSEC) without secure domain resolution. According to one embodiment of the invention, security in the Internet Protocol security protocol (IPSEC) without secure domain resolution is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for security in the Internet Protocol security protocol (IPSEC) without secure domain resolution as described herein.

Processor 404 may execute the received code as it is received, and/or stored in storage device 410, or other non-volatile storage for later execution. In this manner, computer system 400 may obtain application code in the form of a carrier wave.

7. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system providing Internet protocol security without secure domain name resolution, the system comprising:
a local domain name service (DNS) server that is communicatively coupled to a processor and that includes a secure Internet security protocol (IPSEC) cache, wherein the secure IPSEC cache comprises a plurality of cache entries, wherein each cache entry comprises a domain name and information that uniquely associates the cache entry with a particular application process or execution time, wherein the secure IPSEC cache is readable only by an Internet protocol (IP) processing layer of an operating system that controls execution of an application program by the processor;
a security policy data store that is communicatively coupled to the IP processing layer;
a computer-readable medium accessible to the processor and comprising one or more sequences of instructions which, when executed by the processor, cause the processor to carry out the steps of:
receiving a message generated as a result of execution of the application program and that contains a domain name to be resolved by the local DNS server;
storing, in a first of the cache entries, the domain name contained in the message and identifying information that uniquely associates the first cache entry with a particular application process or execution time;
receiving a data packet from the application;
in response to receiving the data packet from the application, locating an entry in the secure IPSEC cache,
based on the identifying information in the located cache entry, verifying that the domain name in the located entry matches the domain name in the message;
querying the security policy data store for an IPSEC policy matching the domain name in the located entry, wherein the IP processing layer verifies that the policy matches the domain name contained in the message;
in response to obtaining an IPSEC policy, applying the IPSEC policy to the data packet; and
purging the matching entry from the cache.

2. A computer system as recited in claim 1, wherein each cache entry further comprises one or more IP addresses that correspond to the domain name for the entry.

3. A computer system as recited in claim 2, wherein the step of verifying that the domain name in the located entry matches the domain name contained in the message further comprises the step of searching the secure IPSEC cache for an entry that matches a process identifier of the application program.

4. A computer system as recited in claim 2, wherein the information, for each cache entry, that uniquely associates the cache entry with a particular application process or execution time comprises a process identifier value and a transaction identifier value.

5. A computer system as recited in claim 4, wherein the step of verifying that the domain name in the located entry matches the domain name contained in the message further comprises the step of searching the secure IPSEC cache for an entry that matches a process and transaction associated with the application program.

6. A computer system as recited in claim 1, further comprising the step of querying the security policy database for an IPSEC policy based on an IP address that is resolved from the domain name received from the application program only when a matching cache entry is not found by searching the cache based on the domain name.

7. A computer system as recited in claim 1, further comprising the steps of:
wherein the message is a request to resolve the domain name into network addresses;
resolving the domain name using the local DNS server, resulting in generating one or more network addresses corresponding to the domain name;
determining the identifier information that uniquely associates the request with a particular application process or execution time; and
storing the network addresses in the first cache entry of the secure IPSEC cache.

8. A method for providing Internet protocol security without secure domain name resolution, the method comprising the computer-implemented steps of:
receiving a message generated as a result of execution of an application program and that contains a domain name to be resolved by the local DNS server;
storing, in a first cache entry of a secure Internet security protocol (IPSEC) cache, the domain name contained in the message and identifying information that uniquely associates the first cache entry with a particular application process or execution time, wherein the secure IPSEC cache is communicatively coupled to a local domain name service (DNS) server, and wherein the secure IPSEC cache is readable only by an Internet protocol (IP) processing layer of an operating system that controls execution of the application program, and wherein each cache entry comprises information that uniquely associates the cache entry with a particular application process or execution time;
receiving a data packet from the application;
in response to receiving the data packet from the application, locating an entry in the secure IPSEC cache;
based on the identifying information in the located cache entry, verifying that the domain name in the located entry matches the domain name in the message;
in response to obtaining an IPSEC policy, querying a security policy data store that is communicatively coupled to the IP processing layer for an IPSEC policy matching the domain name in the located entry, wherein the IP processing layer verifies that the policy matches the domain name contained in the message;
applying the IPSEC policy to the data packet; and
purging the matching entry from the cache.

9. A method as recited in claim 8, wherein each cache entry further comprises one or more IP addresses that correspond to the domain name for the entry.

10. A method as recited in claim 9, wherein the step of verifying that the domain name in the located entry matches the domain name contained in the message further comprises the step of searching the secure IPSEC cache for an entry that matches a process identifier of the application program.

11. A method as recited in claim 9, wherein the information, for each cache entry, that uniquely associates the cache entry with a particular application process or execution time comprises a process identifier value and a transaction identifier value.

12. A method as recited in claim 11, wherein the step of verifying that the domain name in the located entry matches the domain name contained in the message further comprises the step of searching the secure IPSEC cache for an entry that matches a process and transaction associated with the application program.

13. A method as recited in claim 8, further comprising the step of querying the security policy database for an IPSEC policy based on an IP address that is resolved from the domain name received from the application program only when a matching cache entry is not found by searching the cache based on the domain name.

14. A method as recited in claim 8, further comprising the steps of:
wherein the message is a request to resolve the domain name into network addresses;
resolving the domain name using the local DNS server, resulting in generating one or more network addresses corresponding to the DNS name;
determining the identifier information that uniquely associates the request with a particular application process or execution time; and
storing the network addresses in the first cache entry of the secure IPSEC cache.

15. A computer-readable medium carrying one or more sequences of instructions for providing Internet protocol security without secure domain name resolution, which instructions, when executed by one or more processors, cause the one or more processors to carry out the steps of:
receiving a message generated as a result of execution of an application program and that contains a domain name to be resolved by the local DNS server;
storing, in a first cache entry of a secure Internet security protocol (IPSEC) cache, the domain name contained in the message and identifying information that uniquely associates the first cache entry with a particular application process or execution time, wherein the secure IPSEC cache is communicatively coupled to a local domain name service (DNS) server, and wherein the secure IPSEC cache is readable only by an Internet protocol (IP) processing layer of an operating system that controls execution of the application program, and wherein each cache entry comprises information that uniquely associates the cache entry with a particular application process or execution time;
receiving a data packet from the application;
in response to receiving the data packet from the application, locating an entry in the secure IPSEC cache;
based on the identifying information in the located cache entry, verifying that the domain name in the located entry matches the domain name in the message;
in response to obtaining an IPSEC policy, querying a security policy data store that is communicatively coupled to the IP processing layer for an IPSEC policy matching the domain name in the located entry, wherein the IP processing layer verifies that the policy matches the domain name contained in the message;
applying the IPSEC policy to the data packet; and
purging the matching entry from the cache.

16. An apparatus for providing Internet protocol security without secure domain name resolution, comprising:

means for receiving a message generated as a result of execution of an application program and that contains a domain name to be resolved by the local DNS server;

means for storing, in a first cache entry of a secure Internet security protocol (IPSEC) cache, the domain name contained in the message and identifying information that uniquely associates the first cache entry with a particular application process or execution time, wherein the secure IPSEC cache is communicatively coupled to a local domain name service (DNS) server, and wherein the secure IPSEC cache is readable only by an Internet protocol (IP) processing layer of an operating system that controls execution of the application program, and wherein each cache entry comprises information that uniquely associates the cache entry with a particular application process or execution time, means for receiving a data packet from the application;

in response to receiving the data packet from the application, means for locating an entry in the secure IPSEC cache;

based on the identifying information in the located cache entry, means for verifying that the domain name in the located entry matches the domain name in the message;

means for querying a security policy data store that is communicatively coupled to the IP processing layer for an IPSEC policy matching the domain name in the located entry, wherein the IP processing layer verifies that the policy matches the domain name contained in the message;

means for applying the IPSEC policy to the data packet; and means for purging the matching entry from the cache.

17. An apparatus as recited in claim 16, wherein each cache entry further comprises one or more IP addresses that correspond to the domain name for the entry.

18. A apparatus as recited in claim 17, wherein the means for verifying that the domain name in the located entry matches the domain name contained in the message further comprises means for searching the secure IPSEC cache for an entry that matches a process identifier of the application program.

19. A apparatus as recited in claim 18, wherein the information, for each cache entry, that uniquely associates the cache entry with a particular application process or execution time comprises a process identifier value and a transaction identifier value.

20. A apparatus as recited in claim 19, wherein the means for verifying that the domain name in the located entry matches the domain name contained in the message further comprises means for searching the secure IPSEC cache for an entry that matches a process and transaction associated with the application program.

21. A apparatus as recited in claim 16, further comprising means for querying the security policy database for an IPSEC policy based on an IP address that is resolved from the domain name received from the application program only when a matching cache entry is not found by searching the cache based on the domain name.

22. An apparatus as recited in claim 16, wherein the message is a request to resolve the domain name into network addresses; and further comprising:
    means for resolving the domain name the local DNS server, resulting in generating one or more network addresses corresponding to the domain name;
    means for determining identifier information that uniquely associates the request with a particular application process or execution time; and
    means for storing the network addresses as an entry in the secure IPSEC cache.

23. An apparatus for providing Internet protocol security, without secure domain name resolution, for messages that are carried by a packet-switched data network, comprising:
    a network interface that is coupled to the data network for receiving one or more packet flows therefrom;
    a processor;
    one or more stored sequences of instructions which, when executed by the processor, cause the processor to carry out the steps of:
    receiving a message generated as a result of execution of an application program and that contains a domain name to be resolved by the local DNS server;
    storing, in a first cache entry of a secure Internet security protocol (IPSEC) cache, the domain name contained in the message and identifying information that uniquely associates the first cache entry with a particular application process or execution time, wherein the secure IPSEC cache is communicatively coupled to a local domain name service (DNS) server, and wherein the secure IPSEC cache is readable only by an Internet protocol (IP) processing layer of an operating system that controls execution of the application program, and wherein each cache entry comprises information that uniquely associates the cache entry with a particular application process or execution time;
    receiving a data packet from the application;
    in response to receiving the data packet from the application, locating an entry in the secure IPSEC cache;
    based on the identifying information in the located cache entry, verifying that the domain name in the located entry matches the domain name in the message;
    in response to obtaining an IPSEC policy, querying a security policy data store that is communicatively coupled to the IP processing layer for an IPSEC policy matching the domain name in the located entry, wherein the IP processing layer verifies that the policy matches the domain name contained in the message;
    applying the IPSEC policy to the data packet; and
    purging the matching entry from the cache.

* * * * *